L. H. DYER.
SPEED INDICATOR.
APPLICATION FILED MAY 6, 1908.
1,064,461.
Patented June 10, 1913.
4 SHEETS—SHEET 1.
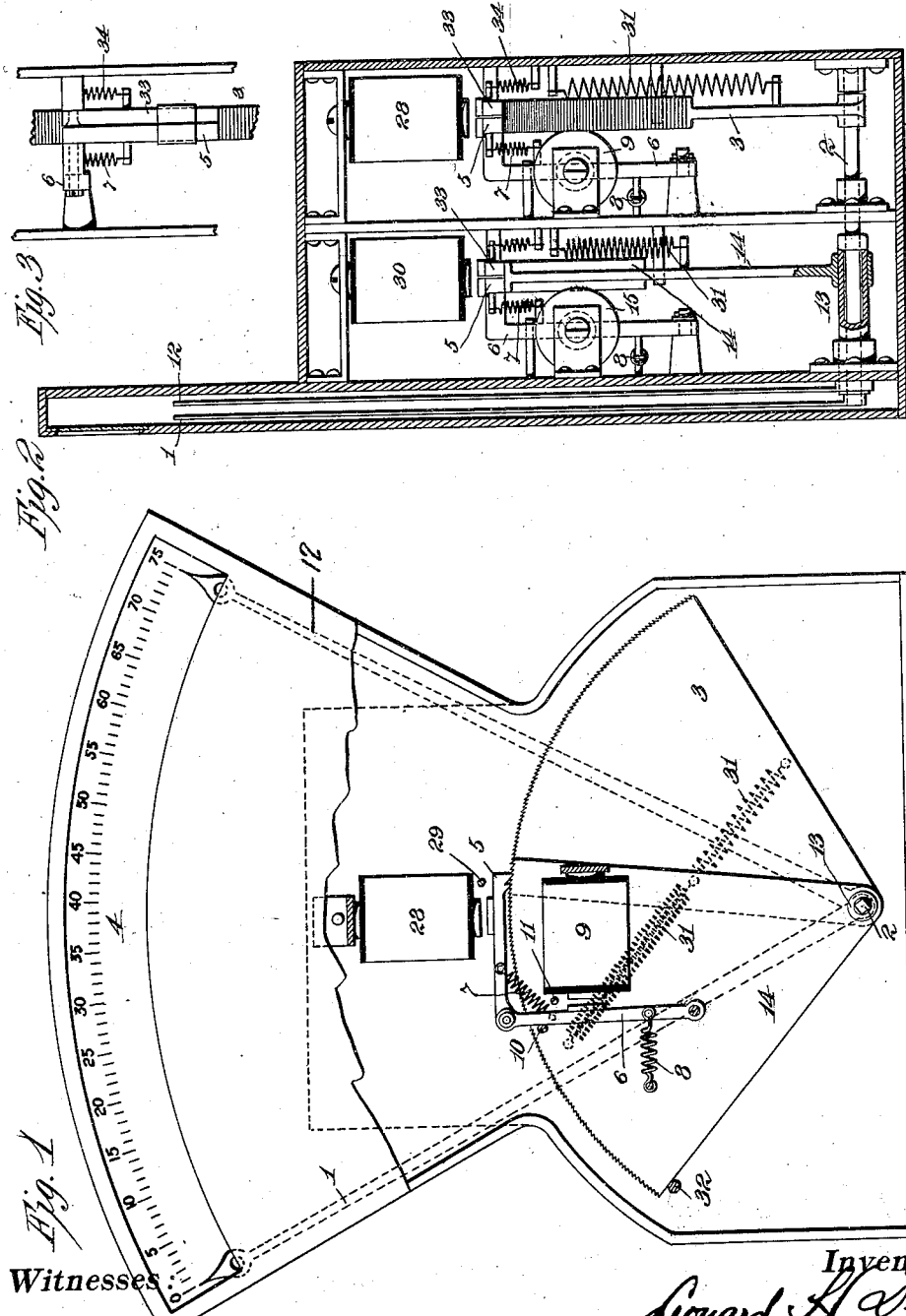

L. H. DYER.
SPEED INDICATOR.
APPLICATION FILED MAY 6, 1908.

1,064,461.

Patented June 10, 1913.
4 SHEETS—SHEET 2.

Witnesses:
Jas. F. Coleman

Inventor
Leonard H. Dyer
by Dyer & Dyer
Attorneys.

L. H. DYER.
SPEED INDICATOR.
APPLICATION FILED MAY 6, 1908.
1,064,461.
Patented June 10, 1913.
4 SHEETS—SHEET 3.
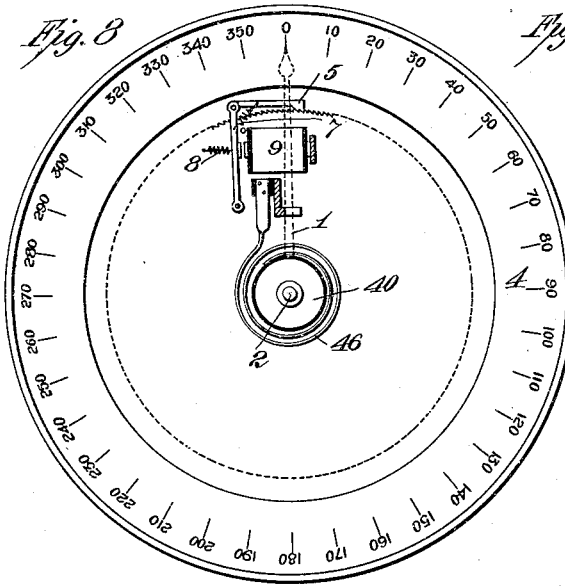
Fig. 8
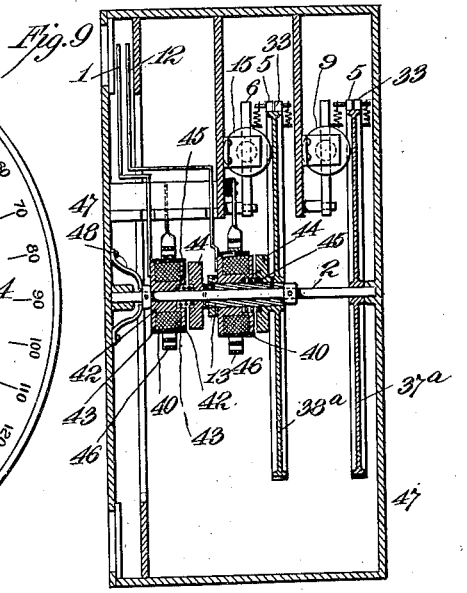
Fig. 9
Fig. 14
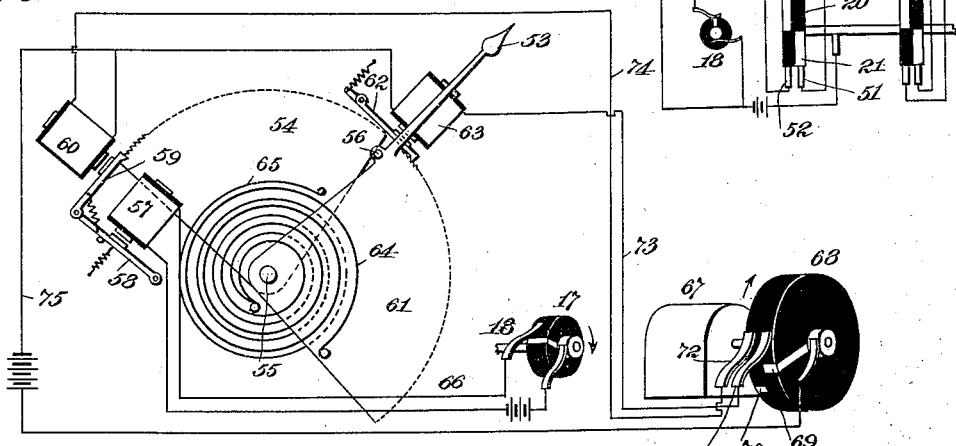
Fig. 10
Witnesses:
Jas. F. Coleman
John T. Fokch
Inventor
Leonard H. Dyer
by Dyer & Dyer
Attorneys.

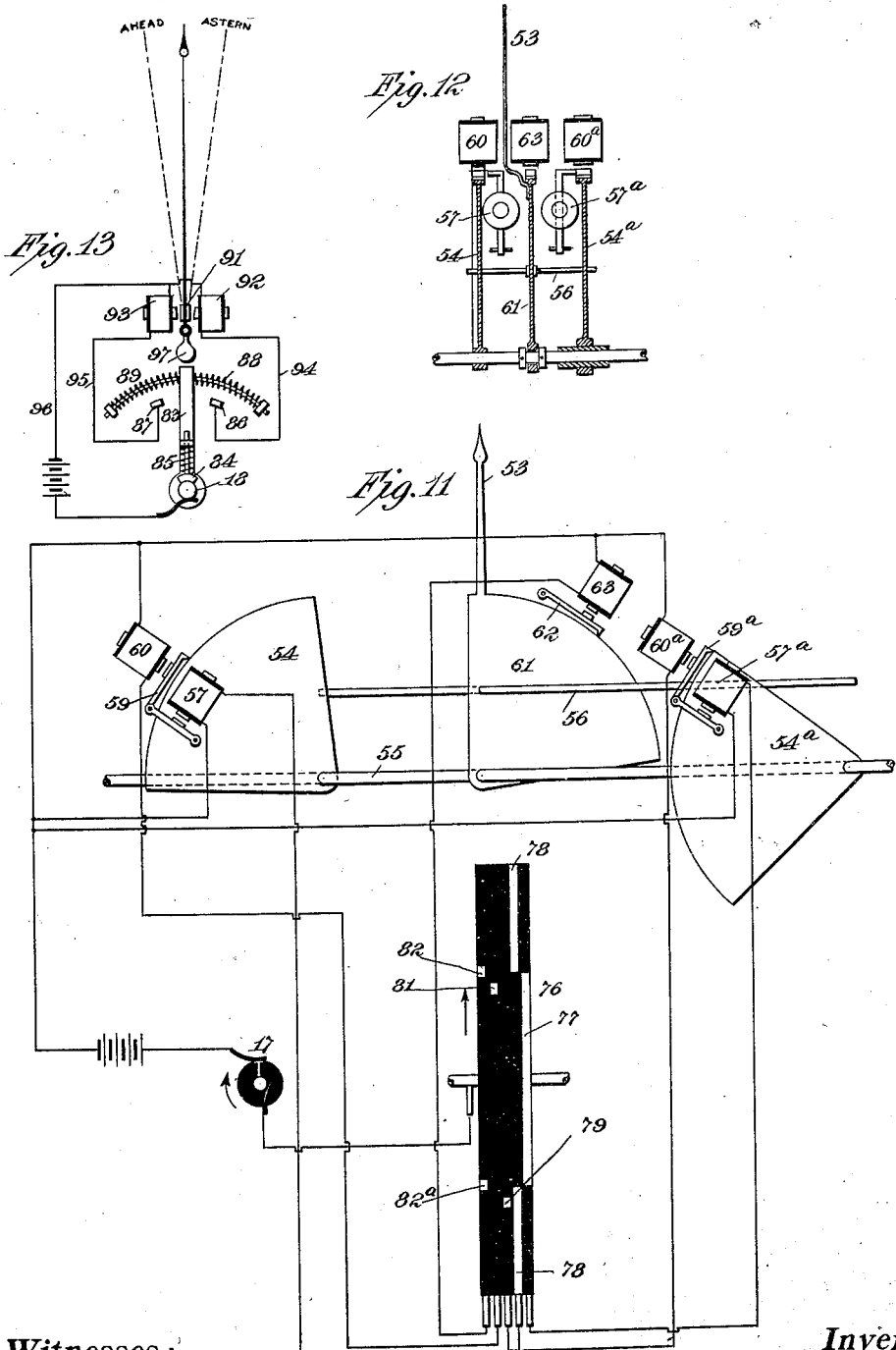

UNITED STATES PATENT OFFICE.

LEONARD H. DYER, OF GREENWICH, CONNECTICUT.

SPEED-INDICATOR.

1,064,461.  Specification of Letters Patent.  Patented June 10, 1913.

Application filed May 6, 1908. Serial No. 431,078.

*To all whom it may concern:*

Be it known that I, LEONARD H. DYER, a citizen of the United States, and a resident of the town of Greenwich, county of Fairfield, and State of Connecticut, have invented a new and useful Speed-Indicator, of which the following is a specification.

The object I have in view is the production of a device for accurately indicating the number of regular movements of a machine during a certain definite period of time.

The particular object is to produce a device for indicating the number of revolutions within a given time of driving engines or other prime movers, and is particularly advantageous for marine use.

So far as I know, no device has been heretofore suggested for accurately and constantly indicating the exact speed of propelling engines of vessels. The need of such a device has been felt for some time, particularly in battle-ships for use when in squadron formation. No accurate means has heretofore been produced for automatically indicating the speed of the engines so that the ships could retain their proper stations. So far as I know, the only mechanism used for this purpose has been a revolution indicator, which has a finger or needle which moves at each revolution of the engine. This, in connection with a time-piece, may be used to indicate the number of revolutions per minute if the revolutions be counted by the observer.

One particular object of my invention is to produce a device which will automatically indicate the number of revolutions that an engine is making.

A further object is to produce a device which will, by direct reading, indicate the number of revolutions that are being made within a certain and definite period of time, and which may be located at a distance from the engine of which the movements are being observed. Such a device may be used upon the bridge of a ship to indicate the speed of the propelling engine.

These and further objects will appear from the following specification and accompanying drawings, considered together or separately.

Figure 4:
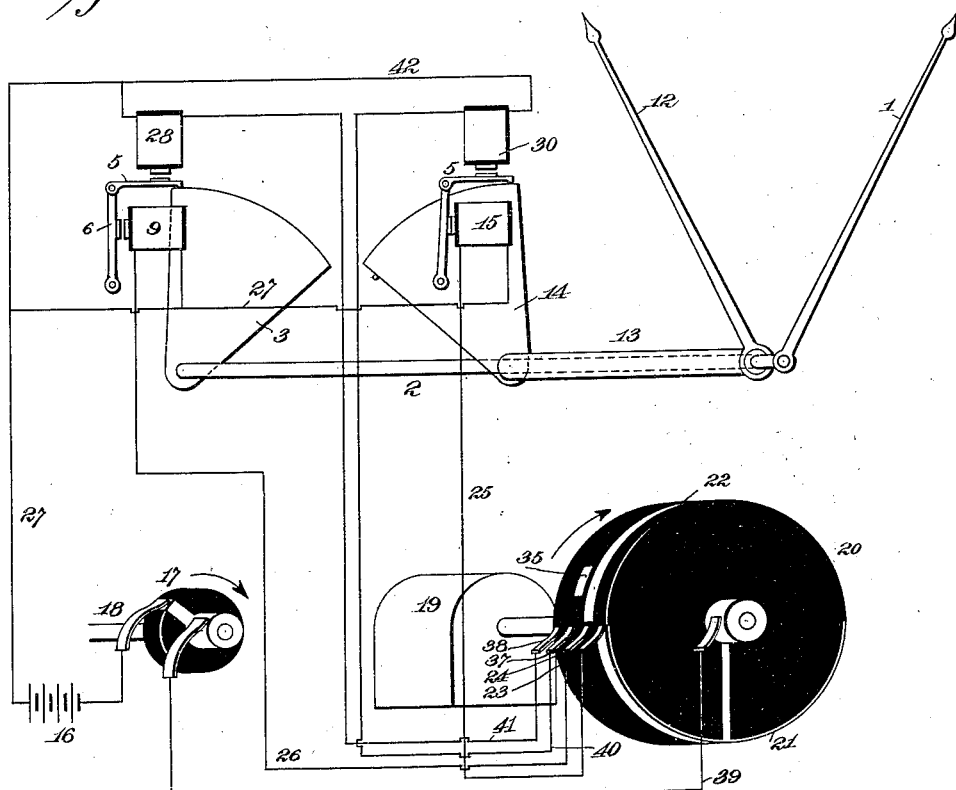
Figure 5:
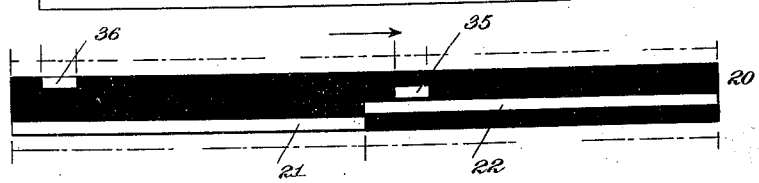
Figure 6:
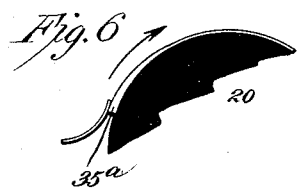
Figure 7:

In the drawings, Figure 1 is a front view of a portion of the apparatus embodying my invention. Fig. 2 is a sectional view of the same. Fig. 3 is a plan view of a detail. Fig. 4 is a diagrammatical view showing one form of complete device. Fig. 5 is a development of one form of switch or commutator which I may employ in connection with such device. Fig. 6 is a detail view of a portion of the mechanism. Fig. 7 is a modified form of circuit-breaker used in connection with the mechanism illustrated in Fig. 4. Fig. 8 is a front view, partly in section, of a modified embodiment of a portion of my invention. Fig. 9 is a transverse sectional view of the same. Fig. 10 is a diagrammatical view of a device showing another modification and illustrating the circuits. Fig. 11 is a diagrammatical view, partly perspective, of still another modification. Fig. 12 is a sectional view of the structure illustrated in Fig. 11. Fig. 13 is a diagrammatical view of an attachment of my device to be used in connection therewith; and Fig. 14 is a diagrammatical view of the form of device shown in Figs. 8 and 9.

In all of the views like parts are designated by the same reference characters.

In carrying out my invention I provide two devices, namely, one of which makes movements or receives impulses corresponding with the movements of the mechanism, the speed of which is to be counted. The second device which operates in conjunction with and interdependently with the first device, moves at a constant and regular speed. The first device is adapted to move an indicating mechanism by impulses; that is to say, it will totalize or aggregate the number of movements or multiples of or fractions of such movements which are made by the observed mechanism. This totalizing or aggregation will continue until arrested by the action of the second device, whereupon the totalizing action will be repeated by the first device.

In the apparatus illustrated in the drawings, the totalizing or aggregating device comprises mechanism which sets in motion a needle, indicator or indicating finger 1, which is carried upon a shaft 2. This shaft is adapted to be rotated by means of a toothed sector 3. The needle or finger 1 is adapted to traverse a scale 4, which in the embodiment illustrated indicates up to 75. The size of the scale and the arrangement of its subdivisions depends upon the character of the work demanded of the device. The sector 3 is provided, in this instance, with 75 teeth, which are equally spaced, as are the indications upon the scale 4. The sector is adapted to be moved step by step to cause the needle to successively point to successive indications upon the scale, such movement being made through the agency of a pawl 5, which is carried upon an arm 6. The pawl is caused to engage with the sector by means of a spring 7. The arm 6, which carries the pawl, is moved in one direction by a spring 8, and in the other direction by a magnet 9. The armature of the magnet is carried by the arm 6, and is within the magnetic field of the magnet. Stops are provided, as shown, for preventing the arm 6 from being moved more than the distance of one tooth backward, and to prevent the armature from coming in actual contact with the magnet so that freezing will not occur. These stops are indicated by the numbers 10 and 11 respectively.

In connection with the mechanism already described is used a second needle or finger 12, which will indicate upon the same scale 4 as the other. This needle preferably turns upon the same axis as the first needle, a construction which can be attained by mounting it upon a sleeve 13 surrounding and supported upon the shaft 2. This sleeve carries a sector and the moving mechanism similar to the sector 3, as has already been described. This mechanism embraces a magnet 15, which is similar to the magnet 9. To prevent the sector 3 or 14 from moving the other way, each is provided with a pawl 33, forced into engagement with the teeth of the sector by a spring 34. The sectors are independently moved, when the pawls 5 and 33 are released by means of springs 31—31 connecting each sector to the frame or other anchorage.

In connection with the mechanism already described, I provide a battery 16, or other source of current, and a circuit breaker 17 (see Fig. 4). This circuit breaker is mounted upon a shaft 18, turned by the machine of which the speed is to be observed. In connection with a marine installation, this shaft would be a shaft turning preferably at the same speed as that of the engines; it may be the engine shaft. The circuit breaker is adapted to make and break the circuit once in every revolution of the shaft.

So much of the structure described constitutes the first device or mechanism responsive to movements of the machine of which the speed is to be observed. The second device which is illustrated in Fig. 4 comprises a clock-work 19 and a switch 20. The clock-work may be adapted to rotate the switch, in the embodiment illustrated, one revolution every two minutes. The switch comprises a cylindrical body of insulation carrying a current-conducting strip 21, and a second current-conducting strip 22 (see Fig. 5). The current-conducting strip 21 is adapted to be engaged by a brush 23, while the strip 22 is adapted to be engaged by a brush 24. These brushes are fixed and are adapted to engage with the periphery of the insulating cylinder. During one-half of the revolution of the cylinder, the strip 21 will engage with the brush 23, and during the other half revolution of the cylinder the strip 22 will engage with the brush 24. The brush 22 is connected by a wire 25 to the magnet 9; the brush 24 is connected by a wire 26 to the magnet 15. The contact strips 21 and 22 are connected by a wire 39 to the circuit breaker 17. Both magnets are connected by a wire 27 forming a common return, and make a complete circuit through the battery 16 and circuit breaker 17.

With the apparatus described it is apparent that the circuit is broken by the circuit breaker 17 once in every revolution of the shaft 18, and the magnet 9 or 15 is energized once during every such revolution. The position of the switch 20 determines which of the magnets 9 or 15 is energized. The alternate periodical energization of the magnets will attract the armature of the excited magnet, and move the arm 6, causing the pawl 5 to engage with the successive teeth of the sectors 3 or 14. This will move one or the other of the sectors through a portion of the arc and cause the needle to move over the scale 4, indicating the number of revolutions that the shaft 18 has made within the time that the switch 20 has made half a revolution. I provide means for returning each needle to zero after it has indicated the number of revolutions that the shaft 18 has made during the period of time that the switch 20 has made a half revolution. One form of device for accomplishing this is shown in Figs. 1, 2 and 3. Above the pawl 5 (see Fig. 1) is arranged a magnet 28, which is adapted to engage with an armature carried by the pawl 5 and an armature carried by the pawl 33. A stop 29 prevents the armatures coming into actual contact with the core of the magnet so that the parts will be kept from freezing together. A magnet 30 is provided for the pawls which actuate and control the sector 14. By energizing one or the other of the magnets, the two pawls will be lifted from the particular sector, and the spring 31 will return the sector to its initial position in engagement with the stop 32, returning the needle or finger to its position on the zero on the scale. I arrange the mechanism so that the two needles 1 and 12 are alternately operated; one needle will indicate the number of revolutions for one minute, and will remain in that position, while the second needle is totalizing the number of revolutions for the second minute. Immediately at or before the termination of the second minute, the first needle will be returned to zero by the excitation of the magnet 28 or 30, and the first needle will continue to move. When it has indicated the number of revolutions for that minute, it will remain in that position until it is returned to zero. There will thus be shown upon the scale by one needle the exact number of revolutions that the machine has made during the last minute, while the other needle is showing, step by step, the number of revolutions that are being made.

For the purpose of properly exciting the magnets 28 and 30 at the proper time, I provide a switch which may be combined with the switch 20. This switch comprises contacting strips 35 and 36, which are carried by the insulating cylinder, which also carries the contact strips 21 and 22. Two fixed additional brushes 37 and 38 are provided, which are adapted to engage with the contact strips when the same are passed in contact with the brushes. The brush 37 is adapted to engage with the contact strip 35, while the brush 38 is adapted to engage with the contact strip 36. The contact strips 35 and 36 are connected electrically to a wire 39. The brush 37 is connected to a wire 40, which is connected to the magnet 30. The brush 38 is connected to a wire 41, which is connected to the magnet 28. Both magnets have a common return wire 42, which is connected to the wire or common return 27.

The location and length of the contact strips 35 and 36 may be varied. As shown in Fig. 5 (assuming the switch to be moved in the direction of the arrow) the brushes 24 and 37 will have just left the contact strips 22 and 35. As soon as the brush 37 comes into engagement with the contact strip 35, it will complete the circuit through the wire 40, energizing the magnet 30, and lifting the pawl from the sector 14, and permitting the spring 31 to return the needle 12 to zero on the scale. While the brush 24 is acting upon the contact strip 22 the magnet 9 will be alternately energized, with the result that the sector 3 will be moved step by step to indicate by the needle 1 the number of revolutions made by the shaft 18. As soon as the switch 20 turns to such a degree that the brush 24 is no longer in contact with the strip 22, the magnet 9 is no longer being energized, consequently the sector 3 is no longer moved but it is kept in position by means of the pawls 33 and 5. The needle 1 will thus be returned in position, indicating the number of revolutions of the shaft 8 made during the half revolution of the switch 20. The instant that the brush 24 ceases to be in contact with the strip 22, the brush 23 comes into contact with the strip 21. The needle 12 having been returned to zero, as already described, by the excitation of the magnet 30, the circuit will now pass through the brush 23 and wire 25, alternately exciting the magnet 15 and moving the sector 14 step by step to actuate the needle 12. This will continue until the switch 20 makes another half revolution; in the meantime, before the switch 20 has made quite a half revolution, the contact strip 36 will come in contact with the brush 38, completing the circuit through the wire 41 and exciting the magnet 28, with the result that the pawls, engaging with the sector 3, will be disengaged with such sector, and that sector will be returned to its initial position, returning the needle 1 to zero on the scale. The operation will continue this way; first, the needle 1 will indicate the number of revolutions made by the shaft 18 during the term of one minute, and will remain in such position until near the end of the next minute, when it will return to zero on the scale, and will be in position to again indicate at the proper time; in the meantime, the needle 12 will indicate while the needle 1 is not indicating. This alternate movement will be continued so long as the apparatus remains in operation.

By my invention I am enabled to produce a device which will indicate with great accuracy the number of revolutions that an engine makes at a given time and which may be read directly. The device, as already stated, is particularly useful for marine purposes, particularly for warships, as it enables the person in command to instantly tell, without mental effort, the number of revolutions that are being made by the engine.

The device may be modified in many ways, those illustrated being simply for the purpose of showing the principle of the invention. Instead of the two needles 1 and 12 being employed, a single needle may be used with its intermittently excited magnet 28 or 30, and the switch for controlling such magnet so arranged as to return the needle to zero at the termination of the stated time that the counting is to begin again. It is to be understood that the clock-work described may cause the indicator to change its status at periods different from a minute, such period of time being chosen simply for illustration.

In order that the contact strips 21, 22, 35 and 36 may make a sharp and definite break of the circuit at the proper instant, they may be made as shown in Fig. 6, the strip extending up from the surface of the insulation 20 a sufficient distance to form a sharp edge 35ª, over which the contact spring will pass and produce a snap break.

The device described and illustrated particularly in Fig. 4 will count the number of revolutions that the shaft 18 makes in one minute, giving an impulse to one of the needles 1 or 12 at each revolution of the shaft 18. Instead of having the switch 20 make and break contact and alternately energize the magnets 9 and 15 once in every minute, the period of time may be made greater or less. As an example, the magnets 9 and 15 may be alternately energized every 15 seconds, in which case, with the mechanism illustrated, the needles 1 or 12 would indicate the number of revolutions made in 15 seconds. In connection with this arrangement, the scale or indicator could be so made, as is obvious, by reducing the space between the indications to one-quarter of what they are illustrated, so that the average number of revolutions for a minute would be indicated.

Another modification of the invention would be to have the switch 20 alternately connect with the magnets 9 and 15 at intervals of less than a minute, for instance, 15 seconds, and for the circuit breaker 17 to break the circuit more than once to a revolution, for instance, four times. Such a circuit breaker is illustrated in Fig. 7, there being four contacts 36ª. With this arrangement the needles 1 and 12 will indicate the true number of revolutions that the shaft 18 would make in a minute, but for only the space of a quarter of a minute. This arrangement would be particularly useful for measuring the speed of some engines, such speed being changed within wide limits at short intervals. The number of interruptions that the circuit breaker 17 makes may be increased or diminished, as is obvious, so that the delicacy of the device may be increased as much as desired.

By means of the structure illustrated in Figs. 8 and 9, I avoid the use of the sectors 3 and 14, which are moved in one direction by the magnetic feeding device, and in the other direction by the spring. Instead of sectors I use two toothed wheels 37ª and 38ª. The wheel 37ª is secured to the shaft 2 as before, described in connection with the other embodiment of the invention, while the wheel 38ª is connected to the sleeve 13 as before. Each wheel, 37ª and 38ª, is intermittently moved by the mechanism already described, such mechanism consisting, for the wheel 37ª, of a magnet 9, lever 6, pawl 5 and pawl 33. The mechanism for rotating the wheel 38ª comprises the magnet 15, and its lever and pawls, identical to those used in connection with the magnet 9. The needles 1 and 12 are not directly connected to the shaft 2 and sleeve 13; they are mounted to freely turn upon such shaft 2 and sleeve but are all adapted to be turned therewith by means of the magnetic clutches 40 and 41. The clutches which are shown in Fig. 9 are identical. Each comprises a spool 42, made of magnetic material, and provided with a coil 43. The spool freely turns upon the shaft 2 or sleeve 13, and also may move longitudinally thereon. When the coil is excited the spool is attracted to an armature 44, which is so connected to the shaft or sleeve that it turns with the latter. When the coil is deënergized the spool is separated from the armature by means of a spring 45, which is interposed between the spool and armature.

The coil is connected mechanically and electrically to the rest of the apparatus by means of a coiled current conducting member 46. This coiled current conducting member may be formed of a spiral spring, one end being connected mechanically to the spool 42, and electrically to the coil 43. The other end is supported upon the casing 47, but electrically insulated therefrom. The member 46 is shown in the form of a flat metal strip forming a coil of several convolutions around the spool, and the end which is secured to the casing 47 is twisted at right angles to the other part of the coil, so that this portion may flex, to allow the spool to move longitudinally on the shaft or sleeve. The other end of the coil is electrically connected to the shaft or sleeve, which in turn is electrically connected to the casing 47 by means of the spring 48. This forms the return of the two magnetic clutches. The electrical connections with this apparatus are illustrated in Fig. 14. The magnets 9 and 15 are connected in the same manner, as illustrated in Fig. 4. The clutches 40 and 41 are connected in the circuits 49 and 50 to contact members 51 and 52. The contact members 51 and 52 are so located in relation to the contact members 21 and 22 that the clutch 40 will be energized during the movement of the wheel 37ª, caused by the excitation of the magnet 9, and will remain energized until the magnet 15 has moved the wheel 38ª, and with it, the needle 12, for a period of time extending almost to the end of the next minute (if a minute is the period of time chosen in such apparatus). The clutch 40 will be deënergized, and the needle 1 will be returned to the zero position on the scale by means of the coiled current conducting device 46.

Another embodiment of my invention is illustrated in Fig. 10. In this construction but a single needle 53 is employed, the said needle being actuated by a sector 54 turning upon the shaft 55. The needle 52 turns around the same shaft, and is provided with a pin or stop 56, adapted to be engaged by the sector 54. The sector 54 is moved by means of a magnet 57, which actuates an armature which is carried by an arm 58. This arm is provided with a pawl 59, which engages with the teeth of the sector 54. The armature, carried by the pawl 59, is adapted to be moved by a magnet 60. A second pawl is fitted adjacent to the pawl 59 similar to the pawl 33, already described, for preventing the reverse movement of the sector 54 until both pawls 33 and 59 are moved by excitation of the magnet 60. A second sector 61, mounted upon the same shaft 55, but turning independently of the sector 54, also turns with the needle 53. In the embodiment illustrated, the needle is actually carried by this sector. This sector is toothed, as is the sector 54. It is held in position by means of a pawl 62. This pawl has an armature which is adapted to be attracted by a magnet 63. A spring 64 connected to the sector 61 tends to move the latter in the direction which is opposed by the pawl 62. A second spring 65 is connected to the sector 54, and tends to move it in the direction opposed by the pawl 59. In connection with the device illustrated, a circuit breaker 17 on the shaft 18, is provided, such circuit breaker being connected to the magnet 57 through a circuit 66, such circuit embracing a source of electricity. A clockwork 67 carries a switch 68. This switch is shown as formed of a cylinder of insulating material with a contact 69 and a contact 70, adapted to respectively engage with a brush 71 and a brush 72. The brush 71 is connected through the wire 73 to the magnet 63. The brush 72 is connected through a wire 74 to the magnet 60. A wire 75, forming the common return and including a battery or other source of electricity, is connected with the magnets 63 and 60. The operation of this embodiment of my invention is as follows: Let it be assumed that the clock-work 67 turns the switch 68 at the rate of one revolution a minute. Starting when the device is at rest with the pawl 59 in the first notch of the sector 54, the circuit 66 will be completed every revolution of the shaft 18, exciting the magnet 57 and causing the pawl 59 to feed the sector 54 one notch ahead against the tension of the spring 65. Near the end of the minute (as depends upon the position of the plate 69) this contact will engage with the brush 71, completing the circuit through the magnet 63, and energizing the latter. This will cause the pawl 62 to become disengaged from the teeth on the sector 61, and the spring 64 will move the sector, and with it, the finger 53, to cause the pin 56 to engage with the sector 54. The magnet 57, however, will continue to be energized and deënergized, causing the sector 54 to move, step by step, as depends upon the speed of rotation of the shaft 18. This will continue until the end of the minute, when the contact 70 will come into engagement with the brush 72, completing the circuit through the magnet 60, which will be energized, and the pawls 59 and 33 will be disengaged from the teeth of the sector 54, permitting the spring 65 to move the sector 54 back to the initial point. The magnet 63, however, will be deënergized before the magnet 60, owing to the shape and location of the contacts 69 and 70, consequently the finger 53 will remain in position until it is again moved by the deënergizing of the magnet 63 and the engagement of the pin 56 with the sector 54. Should, owing to the shaft 18 suddenly increasing its speed, the pin 56 be caused to engage with the sector 54 before the energizing of the magnet 63, the sector 61 will be moved ahead, the pawl 62 permitting this to be done. When this situation occurs, the magnet 63, upon being deënergized will have no effect in moving the sector 61, such sector continuing to be moved ahead by the pin 56. The parts can be so proportioned that the energizing of the magnet 63 can occur just an instant before the termination of the end of the minute. By this construction, the finger 53 remains stationary until just before the end of the period of time which is being counted.

For the purpose of avoiding the necessity of the immediate return of the sector 54 to the initial position at the end of the period of time, determined by the rotation of the switch 68, I may use the device illustrated in Figs. 11 and 12. In this device the finger 53, shaft 55, sector 61, magnet 63, pawl 62, and circuit breaker 17 are used, as already described. Two sectors 54 and 54ª are employed, each actuated by the magnets 57, 57ª, pawls 59, 59ª, and releasing magnets 60 and 60ª. The pin 56 is extended, so as to form an extension on both sides of the sector 61 to engage with the sectors 54 and 54ª. This is shown in Fig. 12. In the structure illustrated, the sectors 54 and 54ª are adapted to be alternately moved for a definite period of time; each will be returned to the initial position at the end of that period of time, but will not begin to move until the next period of time. To accomplish this, the switch 76 is employed. In Fig. 11, the switch is shown as developed, i. e., on a plane. A contact 77 connects by a suitable brush and wire with the magnet 57ª. A contact plate 78 connects by a suitable brush and wire, as shown, with the magnet 57. A contact plate 79 connects by a suitable brush and wire with the releasing magnet 60ª, while a contact plate 81 is connected by a suitable brush and wire to the releasing magnet 60. Two contact plates 82 and 82ª connect by a suitable brush and wire with the magnet 63. In the embodiment illustrated, the switch 76 is adapted to be rotated once in every two minutes by a clockwork, such as has already been described. The contact plates 76 and 78 will alternately connect the circuit breaker 17 through the magnets 57 and 57ª, and the sectors 54 and 54ª will be alternately operated, step by step, depending upon the number of rotations of the breaker 17. In the embodiment illustrated, the plate 78 is in connection with its spring, and consequently the magnet 57 and sector 54 are being operated. At the proper moment the contact plate 79 will come in engagement with its coöperating brush, and the magnet 60ª will be energized, releasing the pawl 59ª, and causing the sector 54ª to go back to the initial position. The rotation of the switch 76 in the direction of the arrow will next cause the contact plate 77 to be brought into engagement with its brush, which will result in the intermittent energizing of the magnet 57ª; an instant later the contact plate 81 will come into engagement with its brush, energizing the magnet 60, and causing the sector 54 to go back to the initial position. At every half revolution of the switch 76, the contact plates 82 and 82ª will be brought into engagement with these brushes, and the magnet 63 will be energized, releasing the pawl 62 from the sector 61, and causing the sector to engage the pin 56 with that sector (54 or 54ª) which happens at that moment to be moved by its magnet. By the construction described, no error occurs in the indicating device if the sectors 54 and 54ª do not return immediately to their initial position.

In connection with the various devices described, I illustrate an attachment to indicate the direction of rotation of the shaft 18. This is particularly applicable for marine use, indicating whether the engines are turning ahead or astern. The apparatus is made as follows: Upon the shaft 18 is loosely mounted an arm 83. This arm is electrically connected to the shaft 18, and is mechanically connected by means of a shoe 84, forced with elastic pressure against the shaft by a spring 85. The arm 83 is adapted to make electrical connection with a contact plate 86 when the shaft 18 rotates in one direction, or a contact plate 87 when it rotates in the other direction. Two springs 88 and 89 are used for centering the arm 83. This much of the apparatus may be placed in the engine room. The rest of the apparatus is adapted to be combined with the indicating mechanism, which may be at a distance removed from the engine. Part of the apparatus comprises a needle or indicator 90, which is adapted to be turned about an axis, and is provided with an armature 91 for this purpose. The magnet 92 and the magnet 93 are adapted to engage with this armature upon opposite sides, and turn the needle either one side or the other, as depends upon which of the two magnets is excited. The circuits comprise wires 94, connecting the contact plate 86 to the magnet 92, and a wire 95 connecting the contact plate 87 with the magnet 93. A common return 96, embracing a battery, is employed. The operation of this part of my invention is readily understood from the description already made. When the shaft 18 turns in one direction it will carry the arm 83 with it against the tension of the spring 88, and will cause electrical connection with the contact plate 86, which will energize the magnet 92, and which will move the needle to the right, toward the indication "astern." The shaft 18 being rotated in the other direction will move the arm 83 against the tension of the spring 89, completing the circuit through the contact plate 87, exciting the magnet 93, and moving the needle 90 in the opposite direction, toward the indication "ahead." The needle 90 may be provided with a counterweight 97 for the purpose of moving it to the neutral position, when the shaft 18 is at rest and the magnets cease to be excited.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. A speed indicator having a plurality of counting mechanisms; an indicator actuated by each mechanism; means for alternately actuating said mechanisms; and time mechanisms co-acting therewith.

2. A speed indicator having with the observed mechanism; a plurality of means for successively indicating movements of the observed mechanism; means for actuating said means in alternation; and means co-acting with such first means at definite intervals of time.

3. A speed indicator comprising in combination; the observed mechanism; a plurality of means alternately responsive to movements of the observed mechanism; an indicator actuated by each of such mechanisms; with means operatable at intervals of time, coöperating and co-acting with the first means, to change the status of such first means at alternate intervals.

4. A speed indicator comprising in combination; the observed mechanism, a plurality of devices alternately and intermittently responsive to movements of the observed mechanism, to totalize movements; and means operatable at regular intervals co-acting with the first means.

5. A speed indicating apparatus comprising in combination with the observed mechanism; a plurality of totalizing devices alternately and intermittently moved by the observed mechanism; an indicator actuated by each of such devices; and time mechanism, the said time mechanism co-acting with the totalizing devices to affect the indicators at regular intervals.

6. A speed indicator comprising in combination with the observed mechanism, a circuit-breaker responsive to movements of the observed mechanism; a plurality of totalizing mechanisms; time mechanism; a circuit including the said circuit-breaker; a magnet and an armature influenced by the magnet; connections actuated by the armature for moving each totalizing mechanism; and a circuit, including a breaker, which is actuated by the time mechanism, for restoring each of the totalizing mechanisms to its initial position, at intervals.

This specification signed and witnessed this fifth day of May, 1908.

LEONARD H. DYER.

Witnesses:
JOHN L. LOTSCH,
FLORENCE B. LAWSON.